United States Patent [19]

Daribi et al.

[11] Patent Number: 6,157,683
[45] Date of Patent: Dec. 5, 2000

[54] METHOD AND SYSTEM FOR AUTOMATIC INVARIANCY COMPENSATION IN DIGITAL COMMUNICATION RECEIVERS

[75] Inventors: Dariush Daribi; Advait Mogre, both of Fremont; Daniel Luthi, San Jose, all of Calif.

[73] Assignee: LSI Logic Corporatino, Milpitas, Calif.

[21] Appl. No.: 09/018,679

[22] Filed: Feb. 4, 1998

[51] Int. Cl.[7] .............................. H03D 1/00; H04L 27/00
[52] U.S. Cl. ................... 375/341; 375/340; 375/262; 375/265; 714/790
[58] Field of Search .................................. 375/341, 262, 375/340, 365, 368; 714/790, 795

[56] References Cited

U.S. PATENT DOCUMENTS

| | | | |
|---|---|---|---|
| 5,469,452 | 11/1995 | Zehavi ...................................... | 714/792 |
| 5,848,102 | 12/1998 | Zehavi et al. ............................. | 375/261 |
| 5,923,666 | 7/1999 | Gledhill et al. ........................... | 370/480 |
| 5,937,016 | 8/1999 | Choi ......................................... | 375/341 |
| 6,005,897 | 12/1999 | McCallister et al. .................... | 375/340 |

Primary Examiner—Stephen Chin
Assistant Examiner—Paul Rupert
Attorney, Agent, or Firm—D'Alessandro & Ritchie

[57] ABSTRACT

A method and system for compensating for code invariancies in a digital communication receiver is performed on demodulated signal data. A pre-Viterbi invariancy compensation is performed on the demodulated signal data to reverse a selected one of a number of possible transformations to create compensated signal data. The compensated signal data is then depunctured. The depunctured data is then decoded. An encoder encodes the decoded data. The encoded data and the depunctured data are then compared to determine equivalence. The pre-Viterbi invariancy compensation is performed to reverse a different one of the number of possible transformations to create the compensated signal data when the encoded data and the depunctured data are determined not to be equivalent. A post-Viterbi invariancy compensation is then performed on the decoded data to produce a set of compensated outputs. Thus, the post-Viterbi invariancy compensation reverses each one of the number of possible transformations on the decoded data. An output is then selected from between the set of compensated outputs and the decoded data in response to detection of a sync byte.

28 Claims, 3 Drawing Sheets

METHOD AND SYSTEM FOR AUTOMATIC INVARIANCY COMPENSATION IN DIGITAL COMMUNICATION RECEIVERS

BACKGROUND OF THE INVENTION

1. Field of the Invention

The present invention relates to a method and system for compensating for code invariancy in digital communication receivers. More particularly, the present invention compensates for invariancies to transformations such as phase rotation, phase inversion, improperly assumed code rate, and errors introduced during depuncturing in punctured convolutional codes.

2. The Background Art

Referring first to FIG. 1, a communication system having a digital signal transmission and receiving system is illustrated. A transmission portion of the digital signal transmission and receiving system includes an encoder 10, a puncturing module 12, and a modulator 14 providing a modulated signal at a communication channel 16. Similarly, a receiving portion of the digital signal transmission and receiving system includes a demodulator 18, a depuncturing module 20, and a decoder 22.

The encoder 10 may be a convolutional encoder. Convolutional codes typically include redundant symbols to increase the signal to noise ratio. In this manner, the probability of errors introduced during subsequent decoding is minimized. Standard convolutional coding techniques often increase required bandwidth. However, some of the coded bits may be systematically removed in favorable channel conditions through a process called "puncturing".

The puncturing module 12 provides punctured data to the modulator 14. Prior to digital signal transmission, puncturing is typically used to remove redundancy in a codeword. In this manner, symbols are systematically deleted or "punctured". Puncturing may be performed at various rates with respect to the basic unpunctured code. For example, a puncturing rate of 3/4 with respect to a basic rate 1/2 encoder is achieved where two out of every three symbols is punctured. Through the use of puncturing, throughput is substantially increased.

The modulated signal includes an in-phase component and a quadrature component. When the modulated signal is received, after conversion from an analog to a digital signal, each bit is demodulated into the in-phase and quadrature signal components by the demodulator 18 using sine and cosine functions. Various puncturing rates used with various modulators may cause a rotation to take place at the demodulator 18. Moreover, an originally correct symbol pairing can get mis-aligned if symbols are lost due to such a temporary disturbance. This rotated sequence may find a "locked position" without derotating, allowing the sequence received by the decoder 22 to appear to be a valid sequence. Thus, the code may be invariant to such a transformation, such as a phase inversion. In other words, for every codeword within a code, there exists a unique transformed codeword, then the code is considered to be invariant to the transformation.

Signal receiver systems conversely may provide a depuncturing scheme to compensate for the puncturing provided prior to transmission. During depuncturing 20, the exact locations within the incoming symbol stream at which place holder symbols "E" are to be inserted must be known. This is impossible when phase rotation is introduced during demodulation 18. As a result, improper symbol alignment during depuncturing 20 results in improper insertion of these place holder symbols.

The decoder 22 may comprise a Viterbi decoder, which may be used to decode these convolutional codes. The Viterbi decoder, therefore, determines the most likely transmitted code word. However, phase mis-alignment occurring during demodulation 18 is not always recognized by the Viterbi decoder. Moreover, improper symbol alignment resulting during depuncturing 20 introduces further errors into the Viterbi decoder. A need exists for a method for systematically handling such transformations occurring on a received codeword from a digital communication transmitter.

Several techniques are currently used for correcting errors introduced during demodulation. First, a correction technique may be introduced at the demodulator 18 output if the occurrence of the specific rotation is known a priori. The input sequence to the Viterbi decoder, therefore, is properly aligned. However, this mis-alignment cannot usually be predicted. Second, a feedback loop may be provided at the decoder 22 output which examines the output for known data patterns and reverses the effect of the assumed transformation in the absence of these known data patterns by feeding the output to the Viterbi decoder input. However, this method introduces a substantial delay into a digital receiving system, since the absence of these known data patterns may not be recognized until a later stage in the digital receiving system. A need exists for a system for compensating for transformations introduced during demodulation which eliminates such a delay without requiring knowledge of such transformations a priori.

BRIEF DESCRIPTION OF THE INVENTION

A method and system for compensating for code invariancies in a digital communication receiver is performed on demodulated signal data. According to a first aspect of the invention, a pre-Viterbi invariancy compensation is performed on the demodulated signal data to reverse a selected one of a number of possible transformations to create compensated signal data. The compensated signal data are then depunctured. The depunctured data is then decoded. An encoder encodes the decoded data. The encoded data and the depunctured data are then compared to determine equivalence. The pre-Viterbi invariancy compensation is performed to reverse a different one of the number of possible transformations to create the compensated signal data when the encoded data and the depunctured data are determined not to be equivalent. The pre-Viterbi invariancy compensation operates to compensate for phase rotation or inversion, incorrect code rate, and errors occurring during depuncturing.

According to a second aspect of the invention, a post-Viterbi invariancy compensation is then performed on the decoded data to produce, in parallel, a set of compensated output data streams. Thus, the post-Viterbi invariancy compensation reverses each one of the number of possible transformations on the decoded data. The post-Viterbi invariancy compensation operates to compensate for phase rotation or inversion. An output is then selected from between the compensated output and the decoded data in response to detection of a sync byte.

Through the use of the present invention, a method and system for compensating for invariancies in punctured convolutional codes are provided. The present invention is superior over prior art methods requiring knowledge of a specific transformation prior to its occurrence. Moreover, delays introduced by prior art systems using a feedback loop are eliminated through use of the present invention. As a result, a variety of transformations occurring in a digital communication receiver may be compensated for in a less time-consuming manner.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

The present invention provides a method and system for anticipating and correcting symbol mis-alignment or transformation occurring during demodulation. In this manner, the present invention compensates for an invariant transformation on the received data likely to be present in some digital communication receiver systems. Thus, code transformation occurring during a particular transmission, such as during channel selection, is recognized and corrected. This method and system may be implemented in software or firmware, as well as in programmable gate array devices, application specific integrated circuits (ASICs) and other hardware.

Figure 1:
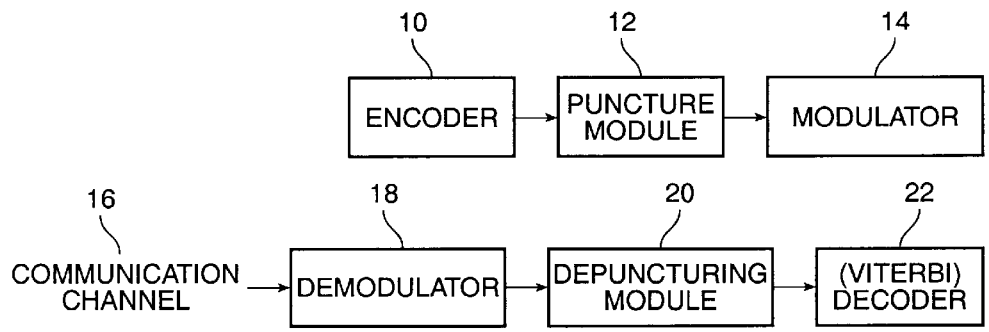
FIG. 1 illustrates a communication system having a digital signal transmission and receiving system.
Figure 2A:
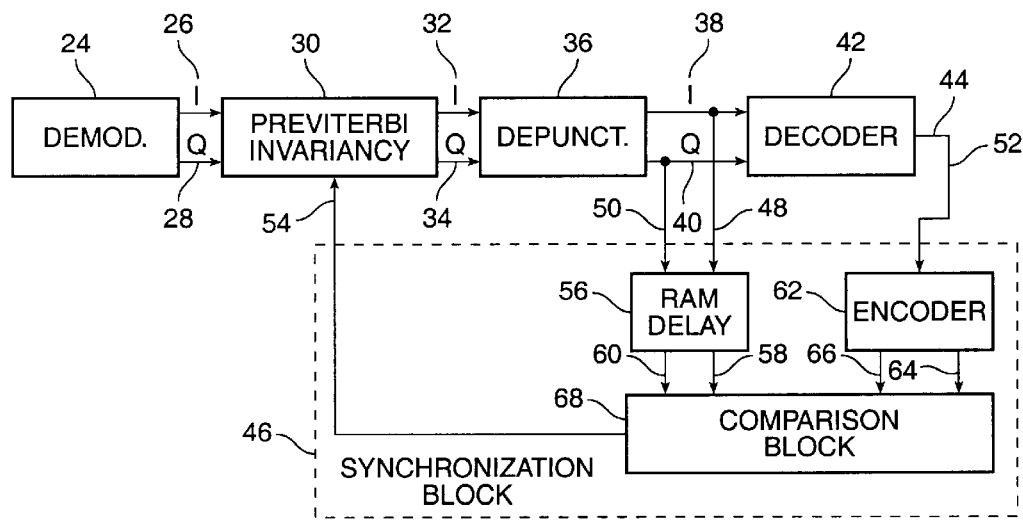
FIG. 2A illustrates a digital receiving system according to a first preferred embodiment of the present invention.

Referring now to FIG. 2A, a digital receiving system according to a first preferred embodiment of the present invention is shown. Through a number of iterations, the present invention systematically reverses a different one of a number of possible transformations through performing a pre-Viterbi invariancy compensation until it is determined that the correct transformation has been reversed.

As shown in FIG. 2A, a demodulator 24 includes an I-channel output 26 and a Q-channel output 28. A pre-Viterbi invariancy compensation block 30 includes an I-channel input operatively coupled to the demodulator I-channel output 26, a Q-channel input operatively coupled to the demodulator Q-channel output 28, an I-channel output 32, and a Q-channel output 34. The pre-Viterbi invariancy compensation block 30 applies an inversion of an assumed transformation T to the I-channel and Q-channel inputs and passes the transformed inputs through to the corresponding pre-Viterbi invariancy compensation block I-channel and Q-channel outputs 32-34. A De-Puncturing block 36 includes an I-channel input operatively coupled to the pre-Viterbi invariancy compensation block I-channel output 32, a Q-channel input operatively coupled to the pre-Viterbi invariancy compensation block Q-channel output 34, an I-channel output 38, and a Q-channel output 40. A Viterbi decoder 42 includes an I-channel input operatively coupled to the De-Puncturing block I-channel output 38, a Q-channel input operatively coupled to the De-Puncturing block Q-channel output 40, and an output comprising decoded bits 44. A synchronization block 46 has an I-channel input 48 operatively coupled to the De-Puncturing block I-channel output 38, a Q-channel input 50 operatively coupled to the De-Puncturing block Q-channel output 40, a decoded input 52 operatively coupled to the Viterbi Decoder output 44, and an output 54 operatively coupled to the pre-Viterbi invariancy compensation block 30. The synchronization block 46 is adapted for determining a transformation T which has occurred on the data, and reversing this transformation T through the pre-Viterbi invariancy compensation block 30 via the synchronization block output 54. Thus, through a number of iterations, the present invention systematically reverses a different one of a number of possible transformations through performing the pre-Viterbi invariancy compensation until the correct transformation has been reversed.

The pre-Viterbi invariancy compensation block 30 provides a means for compensating for invariancy before the decoding is performed. According to a presently preferred embodiment of the present invention, the pre-Viterbi invariancy compensation block 30 performs an inverse of an assumed transformation T according to the following equation: $v=(v'+e)T^{-1}$.

For a given code C of rate k/n, G is a k×n code generator matrix according to the standard for the encoder used. For every k consecutive input symbols u of a given sequence U, G generates a corresponding set of n consecutive output symbols v belonging to the corresponding output sequence V. This may be represented by the relationship v=uG. Moreover, u may be defined by a row vector of dimension 1×k. Similarly, the generated output symbols v may be defined by a row vector of dimension 1×n. For a given transformation T(v,i), there exists a u' such that v'=u'G.

A general class of transformations v'=T(v,i), where I is a symbol index or position, may be described as follows: v'=vT(i)+e, where e is a constant 1×n row vector and T(i) is an n×n matrix. Since v=uG, this class of transformations may be defined as follows: v'=uGT(i)+e. Thus, to reverse this transformation, $v=(v'+e)T^{-1}$. In this manner, the pre-Viterbi invariancy block reverses the transformation T(i) upon the pre-Viterbi invariancy block I-channel and Q-channel inputs.

According to the first preferred embodiment shown in FIG. 2A, a number of iterations are performed until the correct transformation T has been reversed. The correctness of the transformation is determined by the synchronization block 46. The synchronization block 46 recognizes that a transformation T has occurred and reverses this transformation using the pre-Viterbi invariancy compensation block 30. According to a presently preferred embodiment of the present invention, the output of the Viterbi decoder 42 is re-encoded, and the re-encoded data are then compared to the depunctured outputs of the De-Puncturing block 36. If these values are determined to be equal, there has been no transformation T, or upon subsequent iterations, the transformation T is determined to have been corrected. According to a presently preferred embodiment of the present invention, the I-channel and Q-channel inputs 48–50 of the synchronization block 46 corresponding to the de-punctured data are operatively coupled to a RAM delay block 56 having corresponding outputs 58–60, while the Viterbi Decoder output 44 is operatively coupled to an Encoder 62. For example, a ½ Encoder may be used. Thus, for each bit, the Viterbi Encoder generates two bits, which are each placed at corresponding I-channel 64 and Q-channel 66 outputs. The RAM delay block outputs 58–60 and the Viterbi Encoder outputs 64–66 are operatively coupled to a comparison block 68. The comparison block 68 then determines whether the RAM delay block outputs 58–60 corresponding to the depunctured data are equivalent to the Viterbi Encoder outputs 64–66 corresponding to the re-encoded data. One of ordinary skill in the art will readily recognize that various metric evaluators may be applied to determine this equivalence. If the values are determined to be equivalent, the code is synchronized. Alternatively, if the values are determined not to be equivalent, there is a finite number of transformations which may have occurred during transmission, demodulation or depuncturing which may be corrected. One of these transformations may be reversed at the pre-Viterbi invariancy compensation block 30. Thus, through a number of iterations, the synchronization block 46 systematically reverses a different one of these finite number of transformations at the pre-Viterbi invariancy compensation block 30 until the code is determined to be synchronized.

Transformations which may be corrected by the pre-Viterbi invariancy compensation block 30 are finite in number. First, a phase rotation or inversion may have occurred. Second, a placeholder may be incorrectly placed during depuncturing as a result of a "symbol slip", leaving a limited number of alternatives. Third, the rate of coding assumed by the Viterbi Decoder and Encoder may be incorrect. This may occur since a variable rate may be provided to accommodate for changing channel conditions. Thus, the ability to adapt to varying code rates on the fly is imperative. The code rate may be determined using the encoding rate and the puncturing rate. For example, using an encoder having a ½ rate, for each bit, two bits are generated. Thus, for three bits, the encoder generates six bits. If for each six bits, two bits are punctured, four bits remain. Therefore, a code rate of ¾ results.

The comparison block 68 compares the depunctured data with the re-encoded data to determine equivalence. According to a presently preferred embodiment of the present invention, a metric evaluator such as a bit error rate based scheme or a normalization based scheme may be used. Such schemes are known in the art of digital receiving system development.

The first preferred embodiment shown in FIG. 2A may be used to compensate for various transformations. For example, the first preferred embodiment is particularly useful where occurrence of a specified transformation is known a priori. However, it may also be used in combination with a mechanism used to detect the specified transformation, such as that shown in FIG. 2A, in circumstances where the transformation is not known.

Figure 2B:
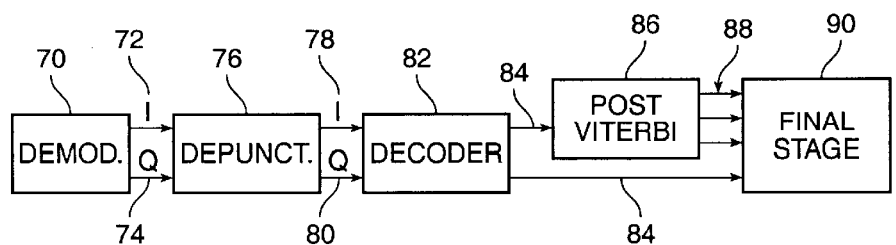
FIG. 2B illustrates a digital receiving system according to a second preferred embodiment of the present invention.

Referring now to FIG. 2B, a digital receiving system according to a second preferred embodiment of the present invention is shown. Each possible transformation is reversed in parallel, producing a first set of compensated outputs. A second output assumes no compensation is required. The correct output is then selected from among the first set of compensated outputs and the second output.

As shown in FIG. 2B, a demodulator 70 includes an I-channel output 72 and a Q-channel output 74. A De-Puncturing block 76 includes an I-channel input operatively coupled to the demodulator I-channel output 72, a Q-channel input operatively coupled to the demodulator Q-channel output 74, an I-channel output 78, and a Q-channel output 80. A Viterbi decoder 82 includes an I-channel input operatively coupled to the De-Puncturing block I-channel output 78, a Q-channel input operatively coupled to the De-Puncturing block Q-channel output 80, an output comprising decoded bits 84 operatively coupled to a post-Viterbi invariancy compensation block 86. The post-Viterbi invariancy compensation block 86 produces a set of compensated outputs 88. A final stage 90 is adapted for selecting between the Viterbi decoder output 84 and the compensated outputs 88 of the post-Viterbi invariancy compensation block 86.

The post-Viterbi invariancy block 86 performs a post-Viterbi compensation on the Viterbi decoder output. The post-Viterbi compensation is defined by the following formula: $u=(u'+u_e)T_u^{-1}=(u'+u_e)GG'_R{}^{-1}$, where $G'=GT$. As described above, for a given transformation $T(v,i)$, there exists a $u'$ such that $v'=u'G$. Thus, $u'=v'G_R^{-1}$, where $T_u=GTG_R^{-1}$. In addition, $u_e=eG_R^{-1}$, where $G_R^{-1}$ designates a feedback free right inverse of the matrix G.

The post-Viterbi invariancy compensation block 86 reverses each possible transformation T and places the reverse transformed value at a different one of the set of compensated outputs 88. In this manner, the post-Viterbi invariancy compensation is performed on the decoded data to produce a set of compensated outputs. According to a presently preferred embodiment of the present invention, each one of the set of compensated outputs is produced in parallel to optimize efficiency. Transformations which may be corrected by the post-Viterbi invariancy compensation block are finite in number. First, a phase rotation or inversion may have occurred. Second, a placeholder may be incorrectly placed during depuncturing as a result of a "symbol slip", leaving a limited number of alternatives. Third, the rate of code assumed by the Viterbi Decoder and Encoder may be incorrect. Thus, the post-Viterbi invariancy compensation block compensates for any invariancies in the code, and the correct output is selected by the final stage 90.

The final stage 90 selects the correct output from among the Viterbi decoder output 84 and the post-Viterbi invariancy compensation block outputs 88. This is possible, since during transmission, a sync byte is added to the bitstream. When the bitstream is correctly decoded, this sync byte will be recognized by this final stage 90. If, however, the bitstream within the code is not correctly decoded, or a transformation has been incorrectly reversed due to the invariancy of the code, this sync byte will not be recognized by the final stage 90. Thus, a search engine may be used to recognize this sync byte and select the correctly decoded bitstream.

The second preferred embodiment illustrated in FIG. 2B provides advantages of parallel processing over the first preferred embodiment. Moreover, the first preferred embodiment requires monitoring of a metric evaluator, such as bit error rate. However, since the complexity of implementation will vary according to the specified transformation, implementation of the second preferred embodiment may not be feasible. Therefore, the first or second preferred embodiment may be selected on a case-by-case basis. Moreover, the first and second preferred embodiment may be combined to achieve optimum results where a first set of transformations is known apriori, while a second set of transformations cannot be predicted with accuracy.

Figure 3:
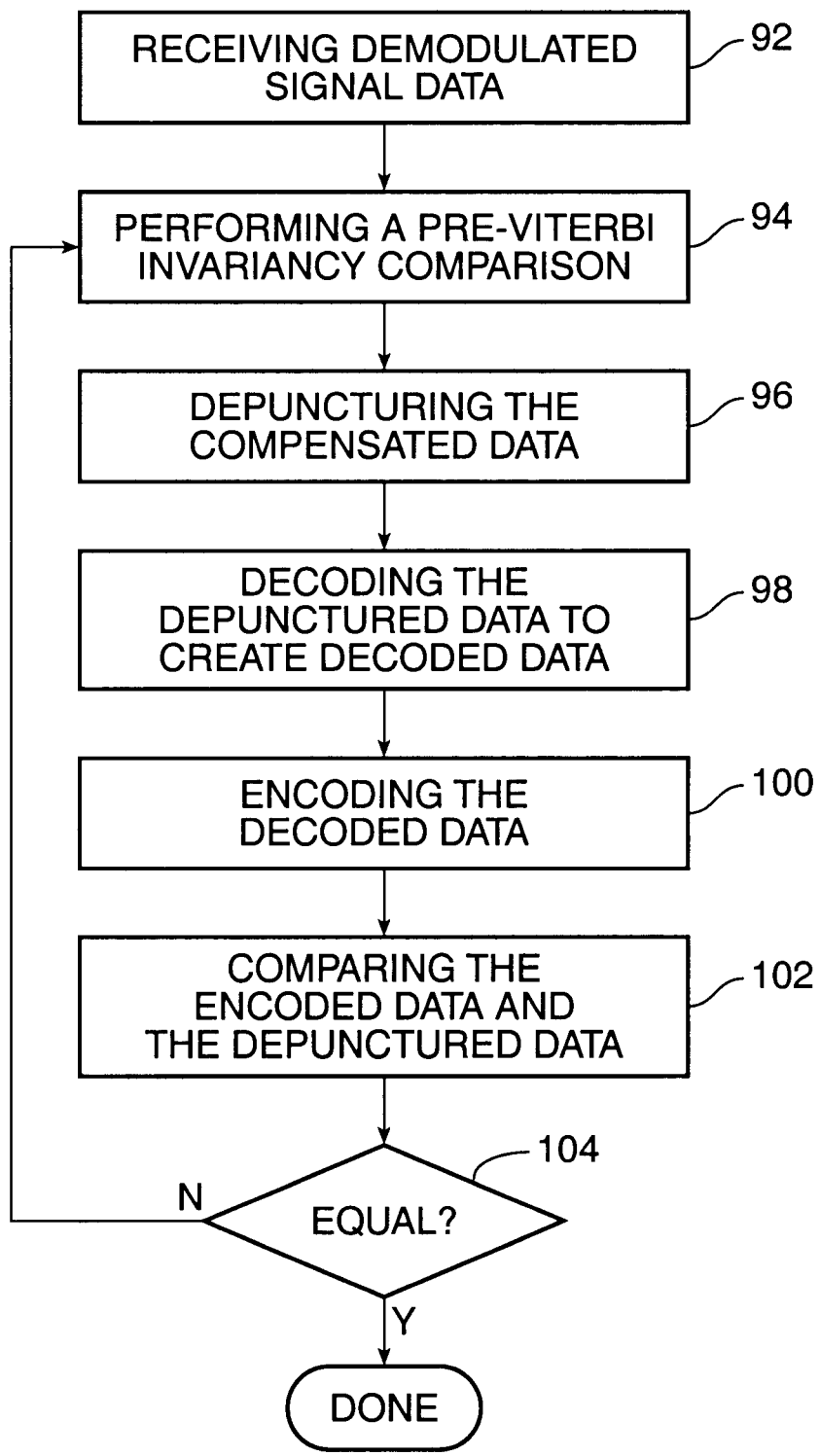
FIG. 3 illustrates a method for compensating for invariancies in modulated encoded signal data according to a presently preferred embodiment of the present invention.

Referring now to FIG. 3, a method for compensating for invariancies in modulated encoded signal data is presented. First, at step 92, demodulated signal data are received. Next, at step 94, a pre-Viterbi invariancy compensation is performed on the demodulated signal data. At step 96, the compensated data are depunctured. The depunctured data are decoded at step 98. These decoded data is then re-encoded at step 100. The encoded data and the depunctured data may then be compared at step 102. If these two values are determined to be unequal at step 104, a pre-Viterbi invariancy compensation is performed at step 94 and the process continues until the two values are determined to be equal at step 104. Those of ordinary skill in the art will readily recognize that the above steps are illustrative only and may be performed in an alternate order.

Figure 4:
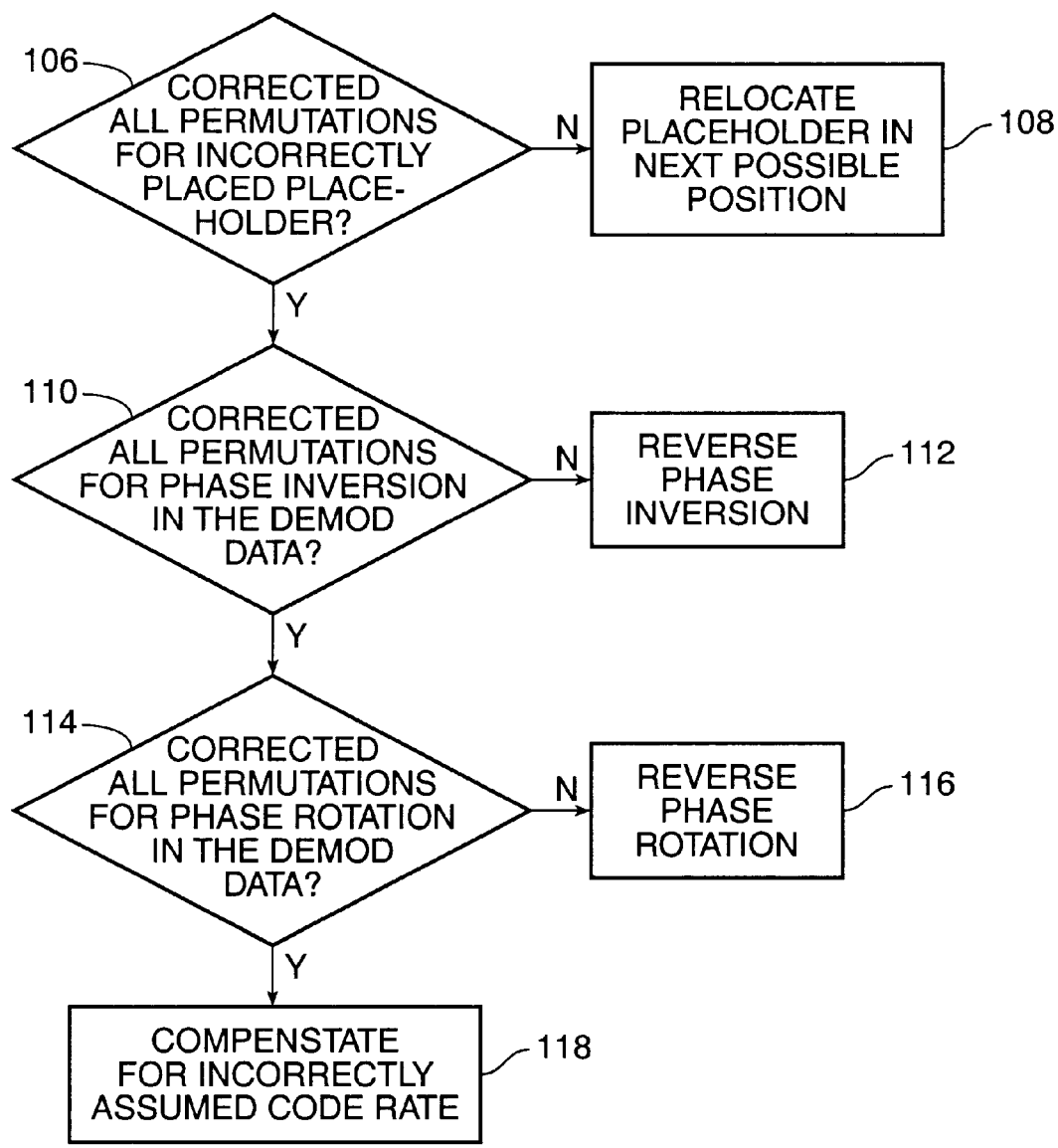
FIG. 4 illustrates a method for performing a pre-Viterbi invariancy compensation according to a presently preferred embodiment of the present invention.

Referring now to FIG. 4, a method for performing a pre-Viterbi invariancy compensation is presented. At step 106, if it is determined that all possible positions for an incorrectly placed placeholder have not been corrected, the placeholder is relocated to a next possible position at step 108. However, if at step 106, it is determined that all possible positions for an incorrectly placed placeholder have been attempted, the method continues to reverse other possible transformations at step 110. At step 110, if it is determined that all possibilities for phase inversion in the demodulated data have not been corrected, the phase inversion is reversed at step 112. However, if at step 110, it is determined that all possibilities for phase inversion in the demodulated data have been corrected, the method continues at step 114. At step 114, if it is determined that all possibilities for phase rotation in the demodulated data have not been corrected, the phase rotation is reversed at step 116. However, if at step 114, it is determined that all possibilities for phase rotation in the demodulated data have been corrected, the method continues at step 118. At step 118, compensation is performed for an incorrectly assumed code rate. Those of ordinary skill in the art will readily recognize that the above steps are illustrative only and may be performed in an alternate order.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for compensating for code invariancies present in demodulated signal data, the method comprising the following steps:

performing a pre-Viterbi invariancy compensation on the demodulated signal data according to a selected one of a number of transformations to create compensated signal data;

depuncturing the compensated signal data to create depunctured data;

decoding the depunctured data to create decoded data;

encoding the decoded data to create encoded data;

comparing the encoded data and the depunctured data to determine equivalence; and systematically reversing a different one of the number of transformations through performing the pre-Viterbi invariancy compensation until the encoded data and the depunctured data are determined to be equivalent.

2. The method according to claim 1, wherein the step for performing a pre-Viterbi invariancy compensation further includes the following sub-steps:

compensating for an incorrectly assumed code rate.

3. The method according to claim 1, wherein the step for performing a pre-Viterbi invariancy compensation further includes the following sub-steps:

reversing a phase rotation in the demodulated signal data.

4. The method according to claim 1, wherein the step for performing a pre-Viterbi invariancy compensation further includes the following sub-steps:

reversing a phase inversion in the demodulated signal data.

5. The method according to claim 1, wherein the step for performing a pre-Viterbi invariancy compensation further includes the following sub-steps:

compensating for an incorrectly placed placeholder.

6. A method for compensating for code invariancies in a digital communication receiver, the method comprising the following steps:

receiving demodulated signal data;

performing a pre-Viterbi invariancy compensation on the demodulated signal data according to a selected one of a number of transformations to create compensated signal data;

depuncturing the compensated signal data to create depunctured data;

decoding the depunctured data to create decoded data;

encoding the decoded data to create encoded data;

comparing the encoded data and the depunctured data to determine equivalence; and performing the pre-Viterbi invariancy compensation to reverse a different one of the number of possible transformations to create the compensated signal data when the encoded data and the depunctured data are determined to be equivalent.

7. The method according to claim 6, wherein the step for performing a pre-Viterbi invariancy compensation further includes the following sub-steps:

compensating for an incorrectly assumed code rate.

8. The method according to claim 6, wherein the step for performing a pre-Viterbi invariancy compensation further includes the following sub-steps:

reversing a phase rotation in the demodulated signal data.

9. The method according to claim 6, wherein the step for performing a pre-Viterbi invariancy compensation further includes the following sub-steps:

reversing a phase inversion in the demodulated signal data.

10. The method according to claim 6, wherein the step for performing a pre-Viterbi invariancy compensation further includes the following sub-steps:

compensating for an incorrectly placed placeholder.

11. An apparatus for compensating for code invariancies present in a digital communication receiver, comprising:

means for receiving demodulated signal data, the demodulated signal data having an in-phase signal component and a quadrature signal component;

a pre-Viterbi invariancy compensation block having an I-channel input operatively coupled to the in-phase signal component, a Q-channel input operatively coupled to the quadrature signal component, an I-channel output, and a Q-channel output, the pre-Viterbi invariancy compensation block adapted for reversing a selected one of a number of transformations on the in-phase signal component and the quadrature signal component at the I-channel and Q-channel outputs;

means for depuncturing signal data having an I-channel input operatively coupled to the pre-Viterbi invariancy compensation block I-channel output, a Q-channel input operatively coupled to the pre-Viterbi invariancy compensation block Q-channel output, an I-channel output, and a Q-channel output, the means for depuncturing placing depunctured in-phase signal data at the I-channel output and depunctured quadrature signal data at the Q-channel output;

a decoder operatively coupled to the means for depuncturing and having an output, the decoder adapted for decoding the depunctured signal data and placing the decoded data at the decoder output; and a synchronization block having a first set of inputs operatively coupled to the means for depuncturing outputs, a second input operatively coupled to the decoder output, and an output operatively coupled to the pre-Viterbi invariancy compensation block, the synchronization block adapted for systematically reversing a different one of the number of transformations at the pre-Viterbi invariancy compensation block until a comparison of the first set of inputs and the second input indicates that a correct transformation has been reversed, wherein the synchronization block further includes:

an encoder having an input operatively coupled to the decoder output, an I-channel output and a Q-channel output, the encoder placing encoded in-phase signal data at the I-channel output and encoded quadrature signal data at the Q-channel output.

a RAM delay block having an I-channel input operatively coupled to the depuncturing block I-channel output, a Q-channel input operatively coupled to the depuncturing block Q-channel output, an I-channel output, and a Q-channel output, the RAM delay block placing the inputs through to the outputs after a specified time period, and a comparison block having a first set of inputs operatively coupled to the encoder outputs, a second set of inputs operatively coupled to the RAM delay block outputs, and an output indicating equivalence of the first and second sets of inputs, the comparison block adapted for determining equivalence of the first set of inputs and the second set of inputs.

12. The apparatus according to claim 11, wherein the pre-Viterbi invariancy compensation block further includes:
means for compensating for an incorrectly assumed code rate.

13. The apparatus according to claim 11, wherein the pre-Viterbi invariancy compensation block further includes:
means for reversing a phase rotation in the demodulated signal data.

14. The apparatus according to claim 11, wherein the pre-Viterbi invariancy compensation block further includes:
means for reversing a phase inversion in the demodulated signal data.

15. The apparatus according to claim 11, wherein the pre-Viterbi invariancy compensation block further includes:
means for compensating for an incorrectly placed placeholder.

16. A method for compensating for code invariancies in a digital communication receiver, the method comprising:
receiving demodulated signal data; and
compensating for a transformation in the demodulated signal data without having knowledge of the transformation, wherein the compensating step further includes
systematically reversing a different one of a number of possible transformations on the demodulated signal data until the transformation is reversed without use of a feedback loop.

17. The method according to claim 16, wherein the systematically reversing step further includes the following sub-steps:
depuncturing the demodulated signal data to create depunctured signal data;
decoding the depunctured data to create decoded signal data;
re-encoding the decoded signal data to create re-encoded signal data; and
comparing the re-encoded signal data with the depunctured signal data to determine when the transformation is reversed.

18. A method for compensating for code invariancies present in demodulated signal data, the method comprising the following steps:
depuncturing the compensated signal data to create depunctured data;
decoding the depunctured data to create decoded data;
performing a post-Viterbi invariancy compensation on the decoded data to produce a set of compensated outputs, the post-Viterbi invariancy compensation step including the step of reversing each one of a plurality of possible transformations on the decoded data; and
selecting an output from among the compensated outputs and the decoded data, the selecting step being performed in response to detection of a sync byte.

19. The method according to claim 18, wherein the step for performing a post-Viterbi invariancy compensation further includes the following sub-steps:
compensating for an incorrectly assumed code rate.

20. The method according to claim 18, wherein the step for performing a post-Viterbi invariancy compensation further includes the following sub-steps:
reversing a phase rotation in the demodulated signal data.

21. The method according to claim 18, wherein the step for performing a post-Viterbi invariancy compensation further includes the following sub-steps:
reversing a phase inversion in the demodulated signal data.

22. The method according to claim 18, wherein the step for performing a post-Viterbi invariancy compensation further includes the following sub-steps:
compensating for an incorrectly placed placeholder.

23. An apparatus for compensating for code invariancies present in a digital communication receiver, comprising:
means for receiving demodulated signal data, the demodulated signal data having an in-phase signal component output and a quadrature signal component output;
means for depuncturing signal data having an I-channel input operatively coupled to the in-phase signal component output, a Q-channel input operatively coupled to the quadrature signal component output, an I-channel output, and a Q-channel output, the means for depuncturing placing depunctured in-phase signal data at the I-channel output and depunctured quadrature signal data at the Q-channel output;
a decoder operatively coupled to the means for depuncturing and having an output, the decoder adapted for decoding the depunctured signal data and placing decoded data at the decoder output;
a post-Viterbi invariancy compensation block having an input operatively coupled to the decoder output, and a set of outputs, the post-Viterbi invariancy compensation block adapted for reversing each one of a plurality of transformations on the decoder output at a different one of the set of outputs; and a final stage adapted for selecting an output from among the set of outputs of the post-Viterbi invariancy compensation block and the output of the decoder in response detection of to a sync byte.

24. The apparatus according to claim 23, wherein the post-Viterbi invariancy compensation block further includes:

means for compensating for an incorrectly assumed code rate.

25. The apparatus according to claim 23, wherein the post-Viterbi invariancy compensation block further includes:

means for reversing a phase rotation in the demodulated signal data.

26. The apparatus according to claim 23, wherein the post-Viterbi invariancy compensation block further includes:

means for reversing a phase inversion in the demodulated signal data.

27. The apparatus according to claim 23, wherein the post-Viterbi invariancy compensation block further includes:

means for compensating for an incorrectly placed placeholder.

28. A method for compensating for code invariancies present in demodulated signal data, the method comprising the following steps:

depuncturing the compensated signal data to create depunctured data;

decoding the depunctured data to create decoded data;

reversing each one of a plurality of possible transformations on the decoded data in parallel to produce a set of compensated outputs; and selecting an output from among the compensated outputs and the decoded data, the selecting step being performed in response to detection of a sync byte.

* * * * *